United States Patent
Yang (10) Patent No.: US 10,091,386 B2
(45) Date of Patent: Oct. 2, 2018

(54) CIRCUITS FOR DETERMINING PARAMETERS FOR CONTROLLING AN IMAGE SENSOR OF AN IMAGE CAPTURING DEVICE AND ASSOCIATED METHOD

(71) Applicant: MStar Semiconductor, Inc., Hsinchu Hsien (TW)

(72) Inventor: Sheng-Long Yang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/638,720

(22) Filed: Jun. 30, 2017

(65) Prior Publication Data
US 2018/0139351 A1 May 17, 2018

(30) Foreign Application Priority Data

Nov. 16, 2016 (TW) .............................. 105137341 A (51) Int. Cl.
| | | |
|---|---|---|
| H04N 1/327 | (2006.01) | |
| H04N 5/232 | (2006.01) | |
| H04N 1/00 | (2006.01) | |
| H04N 1/32 | (2006.01) | |
| G03B 17/12 | (2006.01) | |
| H04N 1/23 | (2006.01) | |
| G06F 3/12 | (2006.01) | |

(52) U.S. Cl.
CPC ......... *H04N 1/32767* (2013.01); *G03B 17/12* (2013.01); *G06F 3/12* (2013.01); *H04N 1/00246* (2013.01); *H04N 1/00251* (2013.01); *H04N 1/233* (2013.01); *H04N 1/32363* (2013.01); *H04N 5/23206* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 2013/0076927 A1* | 3/2013 | Lee | ...................... | H04N 5/2351 348/216.1 |
| 2013/0128061 A1* | 5/2013 | Hsu | ........................ | H04N 5/217 348/208.4 |

FOREIGN PATENT DOCUMENTS

| | | |
|---|---|---|
| TW | 201315218 | 4/2013 |
| TW | 201322765 | 6/2013 |
| TW | 201638836 | 11/2016 |

* cited by examiner

*Primary Examiner* — Andrew H Lam
(74) *Attorney, Agent, or Firm* — WPAT, PC (57) ABSTRACT

A method for controlling an image capturing device includes: calculating luminance data of a first image to generate a plurality of first characteristic values, and calculating luminance data of a second image to generate a plurality of second characteristic values; calculating a plurality of motion values of a plurality of blocks of the second image according to the luminance data of the first image and the luminance data of the second image; determining a plurality of ratio parameters corresponding to the blocks of the second image according to the motion values; generating a plurality of adjusted second characteristic values according to the ratio parameters, the second characteristic values and the first characteristic values; and generating an adjustment signal for controlling the image capturing device according to the adjusted second characteristic values.

20 Claims, 9 Drawing Sheets

CIRCUITS FOR DETERMINING PARAMETERS FOR CONTROLLING AN IMAGE SENSOR OF AN IMAGE CAPTURING DEVICE AND ASSOCIATED METHOD

This application claims the benefit of Taiwan application Serial No. 105137341, filed Nov. 16, 2016, the subject matter of which is incorporated herein by reference.

BACKGROUND OF THE INVENTION

Field of the Invention

The invention relates in general to an image capturing device, and more particularly to a circuit for controlling an exposure time of a sensor in an image capturing device and an associated method.

Description of the Related Art

To provide image data captured by an image capturing device with optimal quality, a conventional image capturing device uses a control circuit to determine an exposure parameter to be later used by a sensor in the image capturing device according to luminance statistical data (e.g., an average luminance value) of an entire image. However, such method does not take relative changes between a moving object and the background of the image into account, and is incapable of providing appropriate exposure control, hence affecting the quality of the image captured.

SUMMARY OF THE INVENTION

It is an object of the present invention to provide a circuit for controlling an exposure time or a gain value of an image sensor and an associated method. The circuit and method of the present invention are capable of determining an evaluated luminance value of each block according to a motion value corresponding to each block, and determining the exposure time or the gain value of the image sensor according to the evaluated luminance values to solve the inadequate exposure control precision of the prior art.

According to an embodiment of the present invention, a circuit for controlling an image capturing device includes a characteristic value calculating circuit, a motion value calculating circuit, a ratio parameter determining circuit, a characteristic value adjusting circuit and an adjustment signal generating circuit. The characteristic value calculating circuit calculates luminance data of a first image to generate a plurality of first characteristic values, and calculates luminance data of a second image to generate a plurality of second characteristic values. The motion value calculating circuit, coupled to the characteristic value calculating circuit, calculates a plurality of motion values of a plurality of blocks of the second image according to the luminance data of the first image and the luminance data of the second image. The ratio parameter determining circuit, coupled to the motion value calculating circuit, determines a plurality of ratio parameters corresponding to the blocks according to the motion values. The characteristic value adjusting circuit, coupled to the ratio parameter determining circuit, generating a plurality of adjusted second characteristic values according to the ratio parameters, the second characteristic values and the first characteristic values. The adjusting signal generating circuit, coupled to the characteristic value adjusting circuit, generates an adjustment signal for controlling the image capturing device according to the adjusted second characteristic values.

According to another embodiment of the present invention, a method for controlling an image capturing device includes: calculating luminance value of a first image to generate a plurality of first characteristic values, and calculating luminance data of a second image to generate a plurality of second characteristic values; calculating a plurality of motion values of a plurality of blocks of the second image according to the luminance data of the first image and the luminance value of the second image; determining a plurality of ratio parameters corresponding to the blocks according to the motion values; generating a plurality of adjusted second characteristic values according to the ratio parameters, the second characteristic values and the first characteristic values; and generating an adjustment signal for controlling the image capturing device according to the adjusted second characteristic values.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
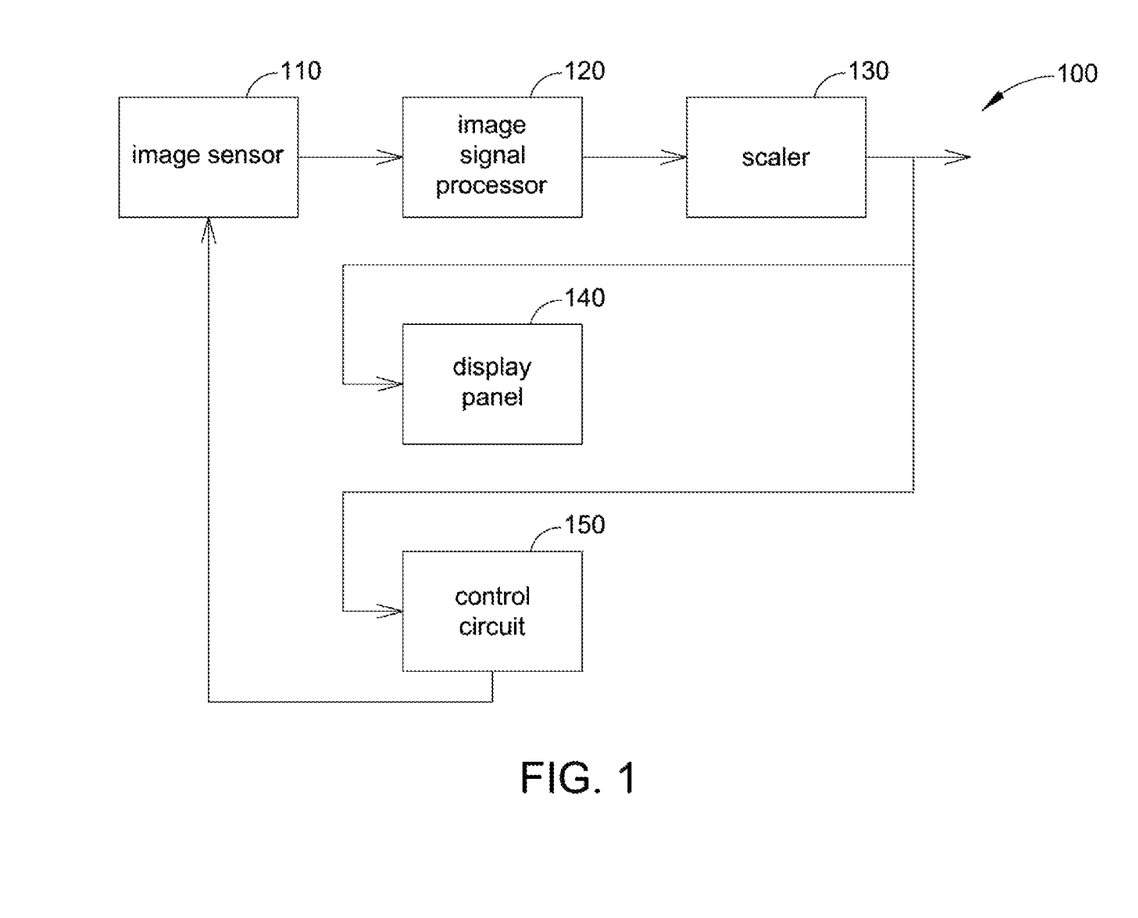
FIG. 1 is a block diagram of an image capturing device according to an embodiment of the present invention.

FIG. 1 shows a block diagram of an image capturing device 100 according to an embodiment of the present invention. As shown in FIG. 1, the image capturing device 100 includes an image sensor 110, an image signal processor (ISP) 120, a scaler 130, a display panel 140 and a control circuit 150. In this embodiment, the image capturing device 100 may be a camera in an electronic device such as a digital camera, a mobile phone or a tablet computer.

In the image capturing device 100, the image sensor 110 senses an image in an ambient environment to sequentially generate multiple original images, and may be implemented by a light sensor array or associated peripheral circuits such as a charge coupled device (CCD) or a complementary metal-oxide semiconductor (CMOS). The image signal processor 120, coupled to the image sensor 110, performs image processing on the multiple original images received. For example, the image processing is white balance, optical black compensation, shading compensation, noise reduction and strong light suppression. The scaler 130, coupled to the image signal processor 120, scales the multiple processed images received to generate multiple scaled images, which may be directly transmitted to a storage device to be stored or first be compressed and then stored. The display panel 140, coupled to the scaler 130, displays the multiple scaled images. The control circuit 150, coupled to the scaler 130 and the image sensor 110, adjusts an exposure parameter of the image sensor 110 according to the multiple scaled images. It should be noted that, the present invention is not limited to the above examples. In another embodiment, the image sensor 110 first performs analog gain on the original images while generating the original images, and the control circuit 150 may also adjust the gain value of the analog gain according to the scaled images. For illustration purposes, adjusting an exposure parameter is taken as an example of the control that the control circuit 150 performs on the image sensor 110. Further, the control circuit 150 may also perform the foregoing adjustment according to the original images that have not been scaled by the scaler 130. The image capturing device 100 disclosed by the present invention is particularly suitable for video recording an object moving at a fast speed, e.g., filming a moving object by a camera handheld by a user moving with the moving object, to provide more precise exposure control. In an alternative embodiment of the present invention, the image capturing device 100 may also be designed as being particularly suitable for filming a dynamic object in an invariant scene.

Figure 2:
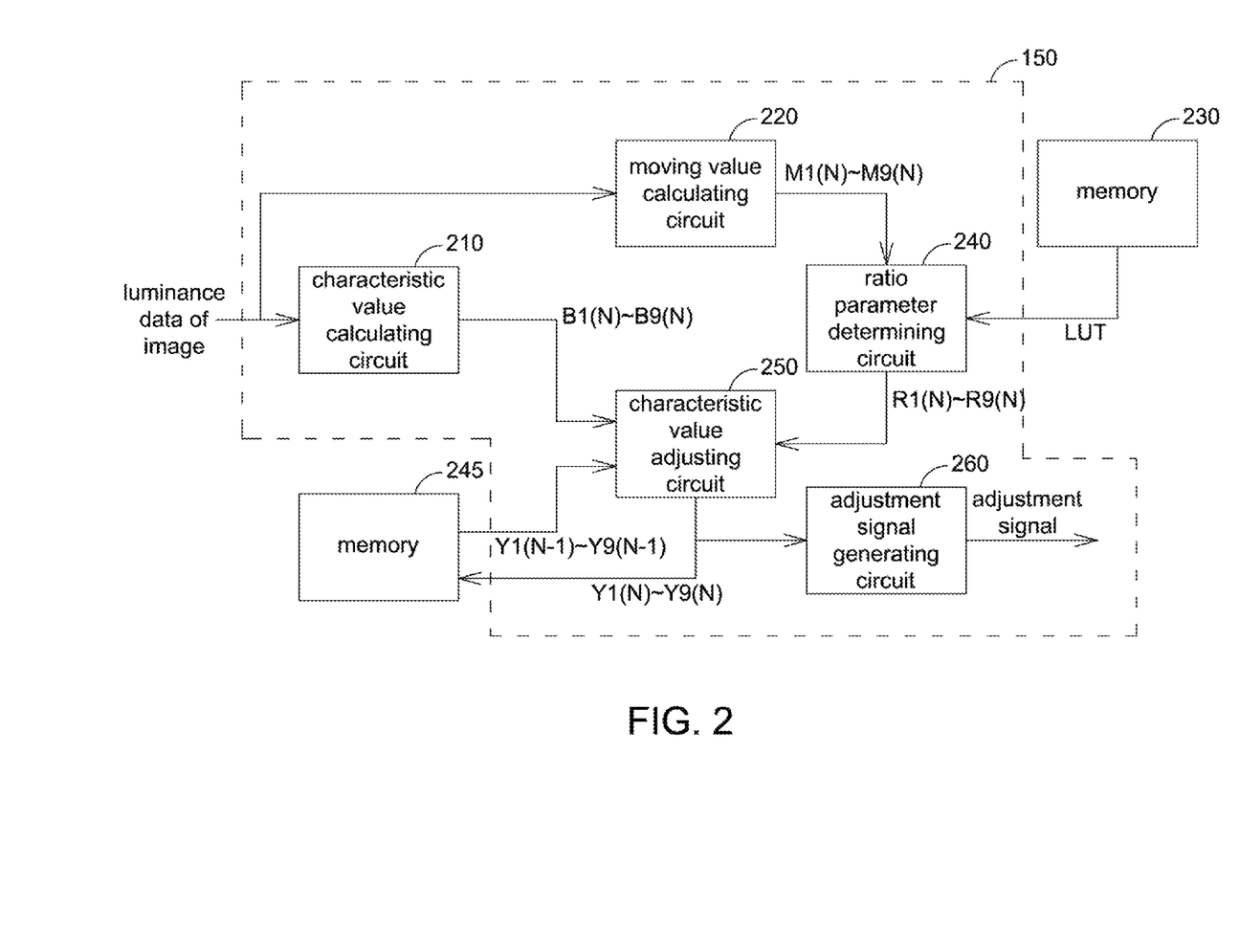
FIG. 2 is a block diagram of a control circuit according to an embodiment of the present invention.
Figure 3:
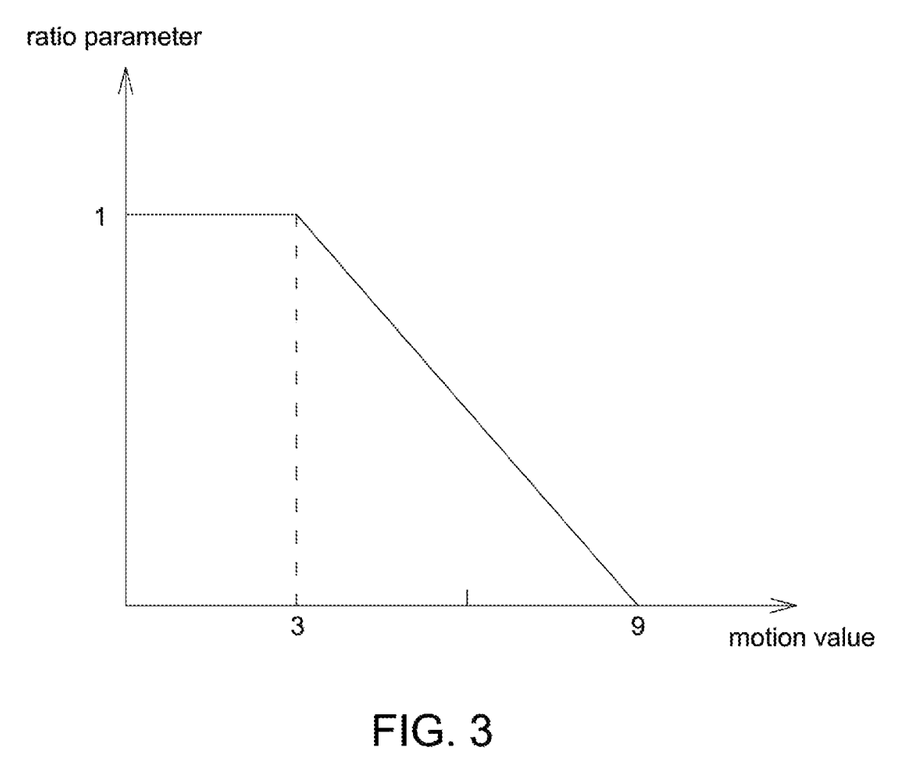
FIG. 3 is a relationship diagram of motion values and ratio parameters recorded in a look-up table (LUT) according to an embodiment of the present invention.

FIG. 2 shows a block diagram of the control circuit 150 according to an embodiment of the present invention. As shown in FIG. 2, the control circuit 150 includes a characteristic value calculating circuit 210, a motion value calculating circuit 220, a ratio parameter determining circuit 240, a characteristic value adjusting circuit 250 and an adjustment signal generating circuit 260. The image capturing device 100 further includes memories 230 and 245. The characteristic value calculating circuit 210 calculates characteristic values of luminance data of multiple images. For illustration purposes in the description below, the characteristic value calculating circuit 210 sequentially receives luminance data of an $(N-1)^{th}$ image and an $N^{th}$ image. The time point of the $N^{th}$ image is later than that of the $(N-1)^{th}$ image, and each of the images includes 9 same-sized blocks B1 to B9. It should be noted that, the above exemplary values are not to be construed as limitations to the present invention. The characteristic value calculating circuit 210 calculates characteristic values B1(N-1) to B9(N-1) of the 9 image blocks of the $(N-1)^{th}$ image and characteristic values B1(N) to B9(N) of the 9 image blocks of the $N^{th}$ image. Because the luminance data of the $(N-1)^{th}$ image is received at an earlier time point, the calculated characteristic values B1(N-1) to B9(N-1) may be first buffered in a memory (not shown). The motion value calculating circuit 220 calculates respective motion values M1(N) to M9(N) of the blocks B1 to B9 of the $N^{th}$ image according to the luminance data of the $(N-1)^{th}$ image and the luminance data of the $N^{th}$ image. The motion value of each of the blocks may be obtained through multiple motion values in that block, and represents the motion level of an object within that block. For example, when a user follows and films a moving object, if the object stays located at the center of the image and the background at the periphery of the image continues changing, the motion value M5 of the block right at the center is the lowest, whereas the motion values of the remaining blocks at the periphery are larger. Details for calculating the motion value are generally known to one person skilled in the art, and shall be omitted herein. It should be noted that, other methods that obtain the motion values in the blocks are also applicable to the present invention. The ratio parameter determining circuit 240 determines ratio parameters R1(N) to R9(N) respectively corresponding to the blocks according to the respective motion values of the blocks that the motion value calculating circuit 220 calculates according to contents of a look-up table (LUT). More specifically, the memory 230 stores the LUT, as shown in FIG. 3 that depicts a relationship diagram of motion values and ratio parameters recorded in the LUT stored in the memory 230 according to an embodiment of the present invention. When an absolute value of a motion value of a block is smaller than 3, the ratio parameter corresponding to the block is "1". When the absolute value of the block is between 3 and 9, the motion value corresponding to the block gets larger, and the corresponding ratio parameter gets lower. When the absolute value of the motion value of the block is larger than 9, the ratio parameter corresponding to the block is "0". It should be noted that the above exemplary values are not to be construed as limitations to the present invention. The characteristic value adjusting circuit 250 generates multiple adjusted characteristic values Y1(N) to Y9(N) respectively corresponding to the blocks B1 to B9 of the $N^{th}$ image according to the characteristic values B1(N) to B9(N), the adjusted characteristic values Y1(N-1) to Y9(N-1) of the blocks B1 to B9 of the $(N-1)^{th}$ image stored in the memory, and the ratio parameters R1(N) to R9(N) respectively corresponding to the blocks. The adjusted characteristic values Y1(N-1) to Y9(N-1) are generated by the characteristic value adjusting circuit 250 at a previous time point according to the similar calculation method (i.e., according to the characteristic values B1(N-1) to B9(N-1) of the $(N-1)^{th}$ image, the adjusted characteristic values Y1(N-2) to Y9(N-2) of the $(N-2)^{th}$ image, and the ratio parameters R1(N-1) to R9(N-1) respectively corresponding to the blocks). More specifically, each block has a characteristic value, e.g., an average luminance value of all pixels in the block. For any block, the characteristic value adjusting circuit 250 may perform a weighted addition or a weighted calculation according to the characteristic value of that block of the $N^{th}$ image and the adjusted characteristic value of that block of the $(N-1)^{th}$ image to generate an adjusted characteristic value of that block of the $N^{th}$ image. The adjusting signal generating circuit 260 generates an adjustment signal for controlling the image sensor 110 according to the adjusted characteristic values Y1(N) to y9(N) corresponding to the $N^{th}$ image.

Figure 4:
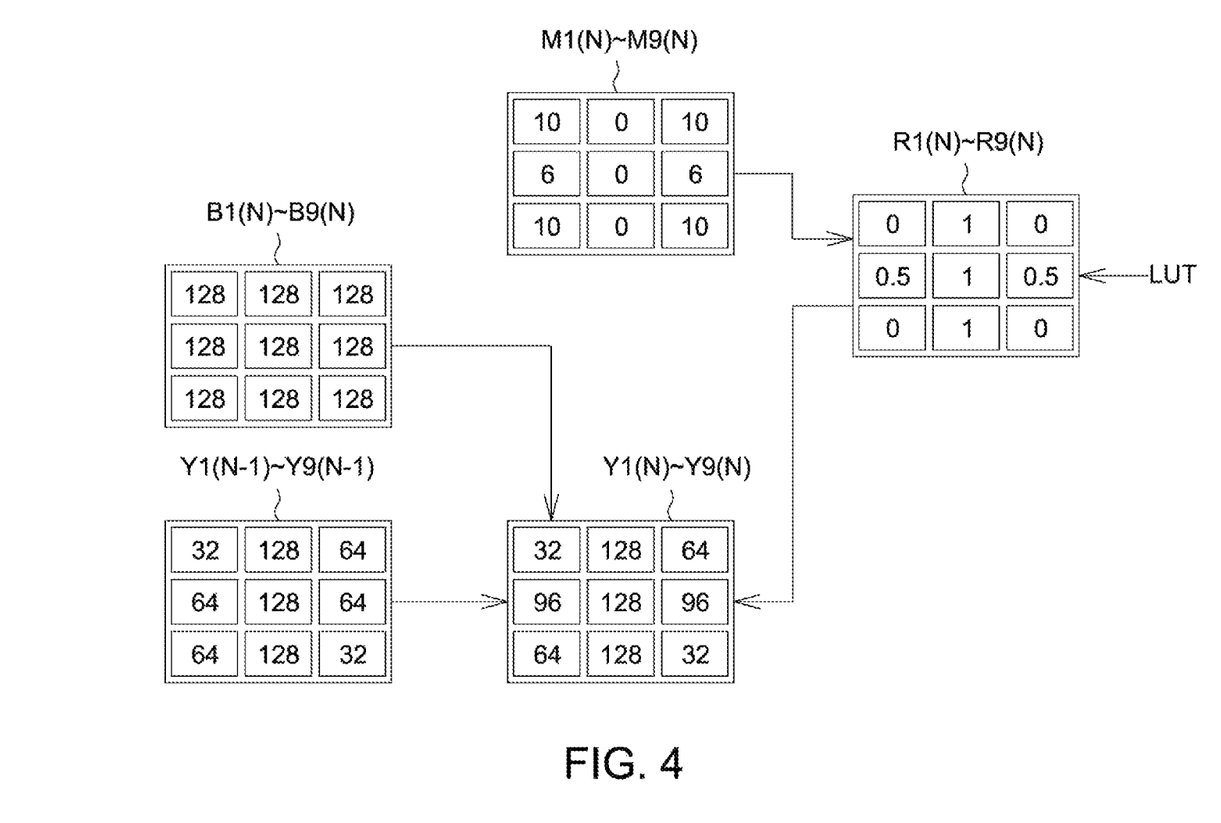
FIG. 4 is a schematic diagram of calculation results calculated by the blocks of the control circuit in FIG. 2 according to an embodiment of the present invention.

FIG. 4 shows a schematic diagram of calculation results calculated by the blocks of the control circuit 150 in FIG. 2 according to an embodiment of the present invention. In FIG. 4, it is assumed that the characteristic values B1(N) to B9(N) of the 9 blocks of the $N^{th}$ image are all 128. Further, the motion values of the blocks in the $N^{th}$ image are respectively M1(N) to M9(N), and the ratio parameter determining circuit 240 determines the ratio parameters R1(N) to R9(N) respectively corresponding to the blocks according to the LUT stored in the memory 230 or a relationship curve depicted in FIG. 3. In this embodiment, as the ratio parameter gets closer to 1, it means that that weight of the characteristic values of the $N^{th}$ image is higher, and the adjusted characteristic values of the $(N-1)^{th}$ image is lower. For example, a ratio parameter "1" means that the weight of the characteristic values of the $N^{th}$ image is "1" and the weight of the adjusted characteristic values of the (N−1)$^{th}$ is "0". In contrast, a ratio parameter "0" means that the characteristic values of the N$^{th}$ image is "0" and the weight of the adjusted characteristic values of the (N−1)$^{th}$ image is "1". For another example, a ratio parameter "0.5" means that the weight of the characteristic values of the N$^{th}$ image is "0.5", and the weight of the adjusted characteristic values of the (N−1)$^{th}$ image is also "0.5". The characteristic value adjusting circuit 250 then performs a weighted addition on the respective characteristic values B1(N) to B9(N) of the blocks of the N$^{th}$ image and the respective adjusted characteristic values Y1(N−1) to Y9(N−1) of the blocks of the (N−1)$^{th}$ image according to the ratio parameters R1(N) to R9(N) of the blocks to obtain the respective adjusted characteristic values Y1(N) to Y9(N) of the blocks of the N$^{th}$ image.

Figure 5:
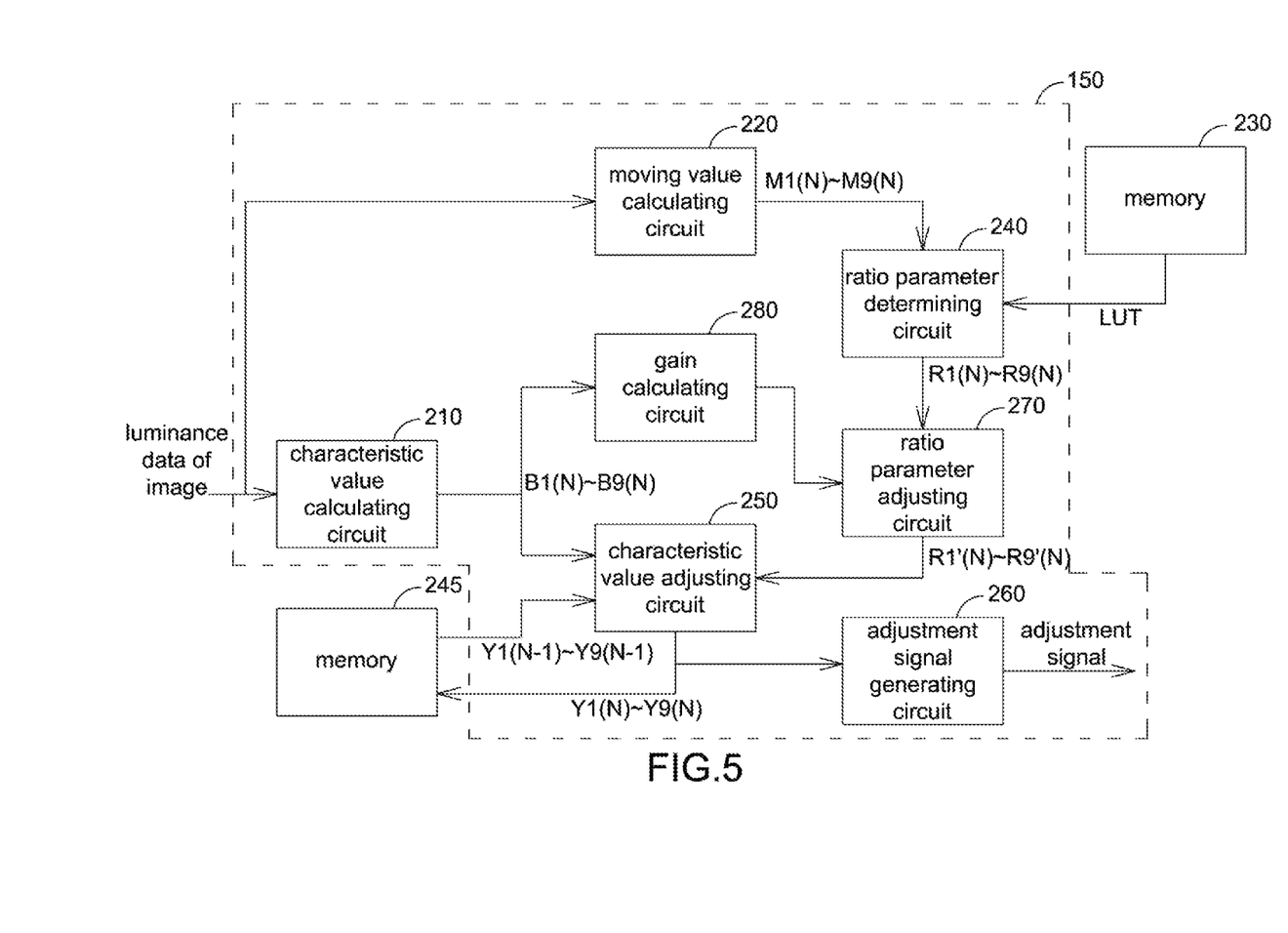
FIG. 5 is a block diagram of a control circuit according to another embodiment of the present invention.

It should be noted that, the embodiments in FIG. 2 to FIG. 4 are illustrative examples, and other auxiliary circuits or reference information may be added in practice to enhance the accuracy of the exposure control signal. For example, FIG. 5 shows a block diagram of the control circuit 150 according to another embodiment of the present invention. The control circuit 150 may further include a gain calculating circuit 280 and a ratio parameter adjusting circuit 270. The gain calculating circuit 280 calculates a gain value of each of the blocks B1 to B9 of the N$^{th}$ image and the (N−1)$^{th}$ image to generate a gain table. For example, assuming that the characteristic value of a block in the N$^{th}$ image is "128" and the adjusted characteristic value of the block in the (N−1)$^{th}$ image is "64", the gain of the block is 2 (i.e., 128/64=2). The ratio parameter adjusting circuit 270 divides the ratio parameters R1(N) to R9(N) generated by the ratio parameter determining circuit 240 by a corresponding gain value to generate adjusted ratio parameters R1'(N) to R9'(N). Then, the characteristic value adjusting circuit 250 performs a weighted addition on the respective characteristic values B1(N) to B9(N) of the blocks of the N$^{th}$ image and the respective adjusted characteristic values Y1(N−1) to Y9(N−1) of the blocks of the (N−1)$^{th}$ block to obtain the respective adjusted characteristic values Y1(N) to Y9(N) of the blocks of the N$^{th}$ image.

Figure 6:
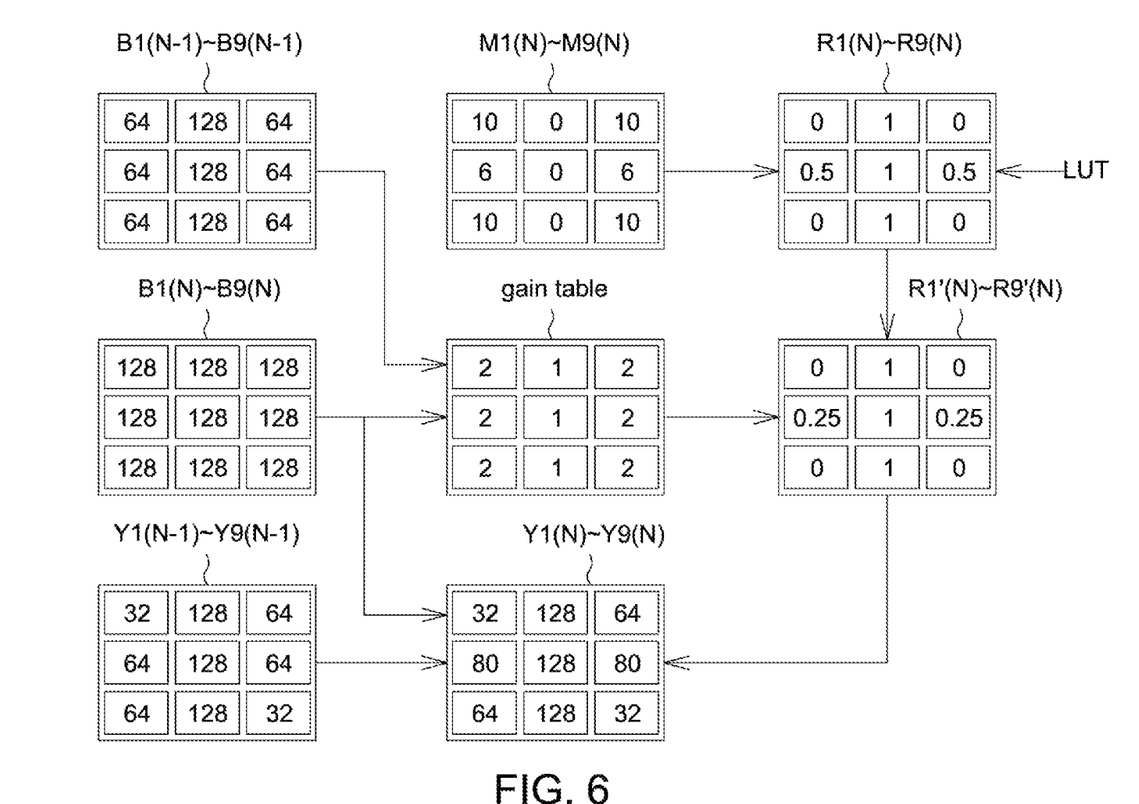
FIG. 6 is a schematic diagram of calculation results calculated by the blocks of the control circuit in FIG. 5 according to an embodiment of the present invention.

FIG. 6 shows a schematic diagram of calculation results calculated by the blocks of the control circuit 150 shown in FIG. 5 according to an embodiment of the present invention. FIG. 6 is similar to FIG. 4, but further includes characteristic values B1(N−1) to B9(N−1) of the 9 blocks of the (N−1)$^{th}$ image, which are respectively 64, 128, 64, 64, 128, 64, 24, 128 and 64. FIG. 6 further includes the calculation results of the gain calculating circuit 280 and the ratio parameter adjusting circuit 270 in FIG. 5. One person skilled in the art can understand contents of FIG. 6 based on the description associated with FIG. 4 and FIG. 5, and such details shall be omitted herein.

Figure 7:
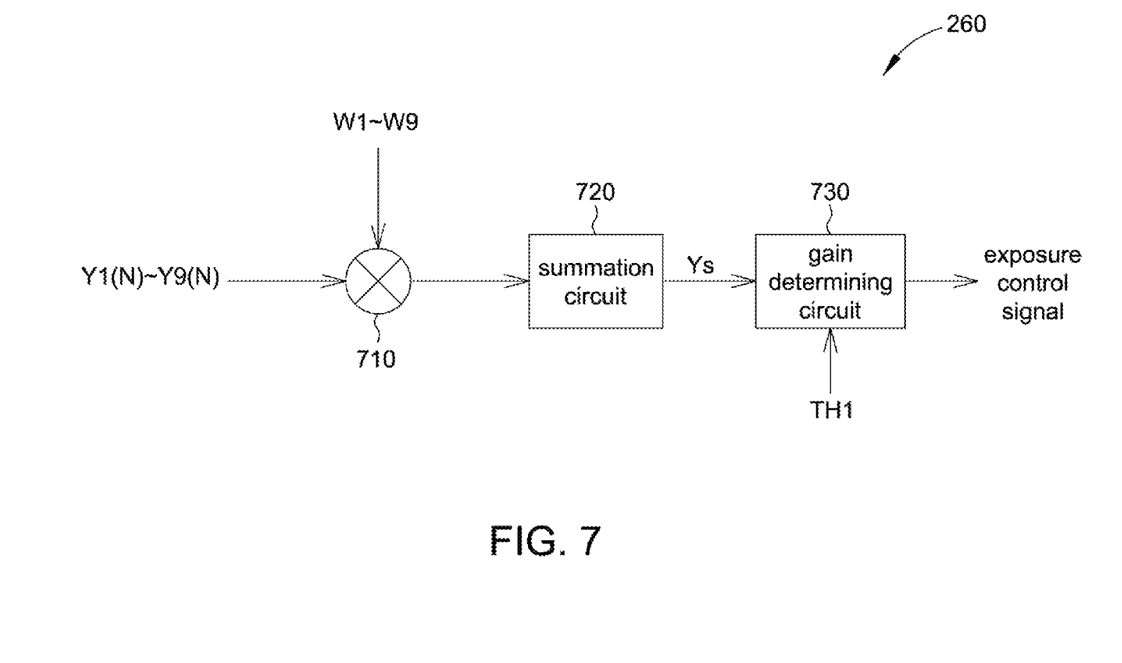
FIG. 7 is a block diagram of an exposure control circuit according to an embodiment of the present invention.

FIG. 7 shows a block diagram of the adjustment signal generating circuit 260 according to an embodiment of the present invention. As shown in FIG. 7, the adjustment signal generating circuit 260 at least includes a multiplier 710, a summation circuit 720 and a gain value determining circuit 730. The multiplier 710 multiplies the adjusted characteristic values Y1(N) to Y9(N) of the blocks in the N$^{th}$ image respectively by weight values W1 to W9 in a predetermined weight table to generate respective weighted adjusted characteristic values of the blocks. The summation circuit 720 adds the weighted adjusted characteristic values corresponding to the blocks to generate a summation value Ys, i.e., Ys=Y1*W1+Y2*W2+ . . . +Y9*W9. The weight table may differ according to a user-selected image capturing mode, different weight tables may be stored in a memory, and a corresponding weight table is read according to a user setting to accordingly set the adjustment signal generating circuit 260. The gain determining circuit 730 calculates the summation value Ys and a threshold TH1, e.g., dividing the threshold TH1 by the summation value Ys, to determine a gain, and to accordingly generate the adjustment signal to the image sensor 110. The threshold TH1 may differ according to the user-selected image capturing mode. Further, in this embodiment, the adjustment signal is for adjusting the exposure time of the image sensor 110. In an alternative embodiment, the adjustment signal may also be applied to adjust an analog gain value of the image sensor 110.

In the above embodiment, the exposure control of the image sensor 110 is determined according to the motion values and the plurality of characteristic values of the N$^{th}$ image and the (N−1)$^{th}$ image. Therefore, when filming a moving object, an object (block) moving fast in the image is treated as background and the associated effect on exposure is reduced (e.g., referring to FIG. 3, illustrating that the ratio parameter gets lower as the motion value becomes larger). In contrast, an object (block) moving slowly in the image is treated as foreground, such that the adjustment signal generating circuit 260 is caused to perform more precise exposure control on the foreground object (referring to FIG. 3, illustrating that the ratio parameter gets higher as the motion value becomes smaller). Thus, the issue of inadequate exposure control precision of the prior art is solved.

Figure 8:
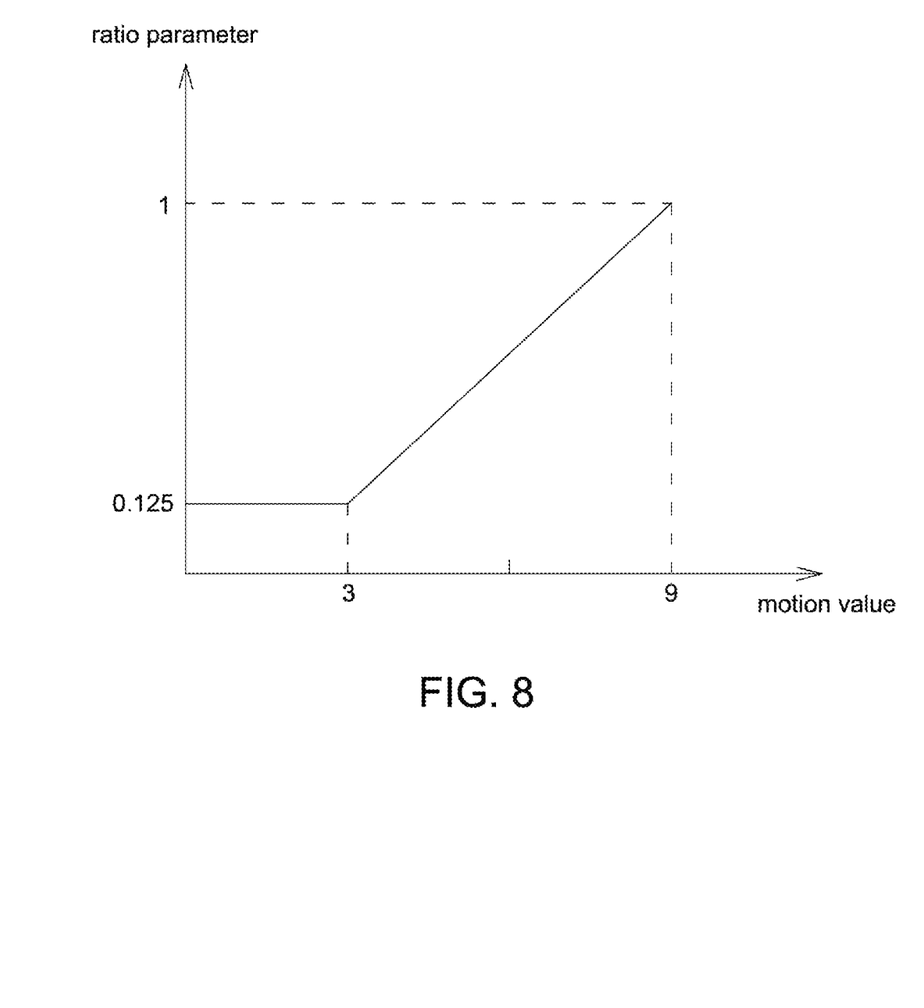
FIG. 8 is a relationship diagram of motion values and ratio parameters recorded in an LUT according to another embodiment of the present invention.

In the embodiments above, the image capturing device 100 is suitable for filming an object moving at a fast speed, e.g., a user following and filming an object by a handheld camera), to provide precise exposure control. However, in another embodiment of the present invention, the image capturing device 100 may be designed to be particularly suitable for filming a moving object in an invariant scene, e.g., continuously filming an entire stadium while also providing precise exposure control on moving ball players. The LUT stored in the memory 230 in FIG. 2 may be modified and represented as a relationship diagram between motion values and ratio parameters shown in FIG. 8. When an absolute value of a motion value of a block is smaller than 3, the ratio parameter determining circuit 240 determines that the ratio parameter corresponding to the block is "0.125". When the absolute value of the motion value of the block is between 3 and 9, the motion value corresponding to the block gets larger, and the corresponding ratio parameter gets higher. When the absolute value of the motion value of the block is larger than 9, the ratio parameter determining circuit 240 determines that the ratio parameter corresponding to the block is "1". In FIG. 8, it should be noted that, the minimum value of the ratio parameter is greater than 0 to prevent severe glittering from occurring in the entire scene. These design modifications are to be encompassed within the scope of the present invention.

Figure 9:
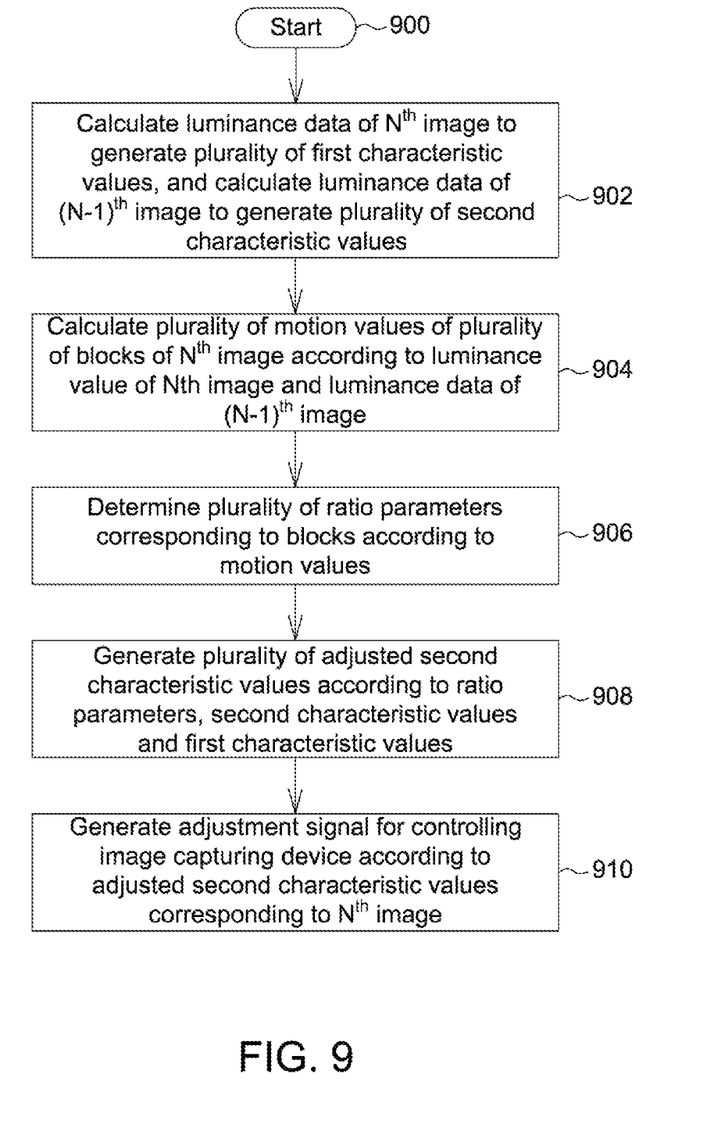
FIG. 9 is a flowchart of a method for controlling a sensor in an image capturing device according to an embodiment of the present invention.

FIG. 9 shows a flowchart of a method for controlling an image capturing device according to an embodiment of the present invention. Referring to the disclosed contents of the above description, the process of the method includes following steps.

In step 900, the process begins.

In step 902, luminance data of an N$^{th}$ image is calculated to generate a plurality of characteristic values, and luminance data of an (N−1)$^{th}$ image is calculated to generate a plurality of second characteristic values.

In step 904, a plurality of motion values of a plurality of blocks of the N$^{th}$ image are calculated according to the luminance data of the N$^{th}$ image and the luminance data of the (N−1)$^{th}$ image.

In step 906, a plurality of ratio parameters corresponding to the blocks are determined according to the motion values.

In step 908, a plurality of adjusted second characteristic values are generated according to the ratio parameters, the second characteristic values and the first characteristic values.

In step 910, an adjustment signal for controlling the image capturing device is generated according to the adjusted second characteristic values corresponding to the $N^{th}$ image.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A circuit for controlling an image capturing device, comprising:
    a characteristic value calculating circuit, calculating luminance data of a first image to generate a plurality of first characteristic values, and calculating luminance data of a second image to generate a plurality of second characteristic values;
    a motion value calculating circuit, calculating a plurality of motion values of a plurality of blocks of the second image according to the luminance data of the first image and the luminance data of the second image;
    a ratio parameter determining circuit, coupled to the motion value calculating circuit, determining a plurality of ratio parameters corresponding to the blocks according to the motion values;
    a characteristic value adjusting circuit, coupled to the ratio parameter determining circuit, generating a plurality of adjusted second characteristic values according to the ratio parameters, the second characteristic values, and the first characteristic values; and
    an adjustment signal generating circuit, coupled to the characteristic value adjusting circuit, generating an adjustment signal for controlling the image capturing device according to the adjusted second characteristic values.

2. The circuit according to claim 1, wherein the characteristic value adjusting circuit generates a plurality of adjusted first characteristic values corresponding to the first image according to the first characteristic values, and generates the adjusted second characteristic values corresponding to the second image according to the adjusted first characteristic values corresponding to the first image.

3. The circuit according to claim 2, wherein the characteristic value adjusting circuit performs a weighted calculation on the adjusted first characteristic values corresponding to the first image and the second characteristic values corresponding to the second image according to the ratio parameters to generate the adjusted second characteristic values corresponding to the second image.

4. The circuit according to claim 3, wherein for one block among the blocks of the second image, when the motion value of the block is greater than a threshold, as the motion value of the block gets larger, the ratio parameter determining circuit determines that a weight of the block of the second image is lower and a weight of the block of the first image is higher.

5. The circuit according to claim 4, wherein when the motion value of the block is smaller than the threshold, the ratio parameter determining circuit determines that the weight of the block of the first image is zero.

6. The circuit according to claim 3, wherein for one block among the blocks of the second image, when the motion value of the block is greater than a threshold, as the motion value of the block gets larger, the ratio parameter determining circuit determines that a weight of the block of the second image is higher and a weight of the block of the first image is lower.

7. The circuit according to claim 6, wherein when the motion value is smaller than the threshold, the ratio parameter determining circuit determines that the weight of the block of the second image is a constant value greater than zero.

8. The circuit according to claim 1, further comprising:
    a gain calculating circuit, calculating a plurality of gain values corresponding to the blocks of the second image according to the first characteristic values and the second characteristic values;
    wherein, the ratio parameter determining circuit adjusts the ratio parameters corresponding to the blocks further according to the gain values, respectively, and the characteristic value adjusting circuit generates the second adjusted characteristic values according to the adjusted ratio parameters.

9. The circuit according to claim 1, wherein the adjustment signal generating circuit generates the adjustment signal according to a sum of the adjusted second characteristic values corresponding to the second image, to further adjust one of an exposure time and a gain value of the image capturing device.

10. The circuit according to claim 9, wherein the sum is a weighted sum, the adjustment signal generating circuit calculates the weighted sum of the adjusted second characteristic values corresponding to the second image according to a weight table, and the weight table is associated with an image capturing mode of the image capturing device.

11. A method for controlling an image capturing method, comprising:
    calculating luminance data of a first image to generate a plurality of first characteristic values, and calculating luminance data of a second image to generate a plurality of second characteristic values;
    calculating a plurality of motion values of a plurality of blocks of the second image according to the luminance data of the first image and the luminance data of the second image;
    determining a plurality of ratio parameters corresponding to the blocks according to the motion values;
    generating a plurality of adjusted second characteristic values according to the ratio parameters, the second characteristic values, and the first characteristic values; and
    generating an adjustment signal for controlling the image capturing device according to the adjusted second characteristic values.

12. The method according to claim 11, wherein the step of generating the adjusted second characteristic values according to the ratio parameters, the second characteristic values and the first characteristic values comprises:
    generating a plurality of adjusted first characteristic values corresponding to the first image according to the first characteristic values, and generating the adjusted second characteristic values corresponding to the second image according to the adjusted first characteristic values corresponding to the first image.

13. The method according to claim 12, wherein the step of generating the first adjusted characteristic values corresponding to the first image according to the first characteristic values, and generating the adjusted second characteristic values corresponding to the second image according to the adjusted first characteristic values comprises:
  performing a weighted calculation on the adjusted first characteristic values corresponding to the first image and the second characteristic values corresponding to the second image according to the ratio parameters to generate the adjusted second characteristic values corresponding to the second image.

14. The method according to claim 13, wherein for one block among the blocks of the second image, when the motion value of the block is greater than a threshold, as the motion value of the block gets larger, a weight of the block of the second image is lower, and a weight of the block of the first image is higher.

15. The method according to claim 14, wherein when the motion value of the block is smaller than the threshold, a weight of the block of the first image is zero.

16. The method according to claim 13, wherein for one block among the blocks of the second image, when the motion value of the block is greater than a threshold, as the motion value of the block gets larger, a weight of the block of the second image is higher, and a weight of the block of the first image is lower.

17. The method according to claim 16, wherein when the motion value is smaller than the threshold, the weight of the block of the second image is a constant value greater than zero.

18. The method according to claim 11, further comprising:
  calculating a plurality of gain values corresponding to the blocks of the second image according to the first characteristic values and the second characteristic values;
  wherein, the step of determining the ratio parameters corresponding to the blocks according to the motion values comprises:
  adjusting the ratio parameters corresponding to the blocks according to the gain values to generate a plurality of adjusted ratio parameters, respectively; and
  the step of generating the adjusted second characteristic values comprises:
  generating the adjusted second characteristic values according to the adjusted ratio parameters.

19. The method according to claim 11, wherein the step of generating the adjustment signal for controlling the image capturing device comprises:
  generating the adjustment signal according to a sum of the adjusted second characteristic values corresponding to the second image, to further adjust one of an exposure time and a gain value of the image capturing device.

20. The method according to claim 19, wherein the sum is a weighted sum, and the step of generating the adjustment signal for controlling the image capturing device comprises:
  calculating the weighted sum of the adjusted second characteristic values corresponding to the second image according to a weight table, wherein the weight table is associated with an image capturing mode of the image capturing device.

* * * * *